(12) United States Patent
Stuart

(10) Patent No.: US 10,862,318 B2
(45) Date of Patent: Dec. 8, 2020

(54) BILEVEL EQUALIZER FOR BATTERY CELL CHARGE MANAGEMENT

(71) Applicant: The University of Toledo, Toledo, OH (US)

(72) Inventor: Thomas A. Stuart, Toledo, OH (US)

(73) Assignee: The University of Toledo, Toledo, OH (US)

( * ) Notice: Subject to any disclaimer, the term of this patent is extended or adjusted under 35 U.S.C. 154(b) by 0 days.

(21) Appl. No.: 16/071,970

(22) PCT Filed: Jan. 27, 2017

(86) PCT No.: PCT/US2017/015378
§ 371 (c)(1),
(2) Date: Jul. 23, 2018

(87) PCT Pub. No.: WO2017/132529
PCT Pub. Date: Aug. 3, 2017

(65) Prior Publication Data
US 2019/0222034 A1    Jul. 18, 2019

Related U.S. Application Data

(60) Provisional application No. 62/287,575, filed on Jan. 27, 2016.

(51) Int. Cl.
*H02J 7/00* (2006.01)
*H01M 10/42* (2006.01)
*H01M 10/44* (2006.01)

(52) U.S. Cl.
CPC ......... *H02J 7/0019* (2013.01); *H01M 10/425* (2013.01); *H01M 10/441* (2013.01);
(Continued)

(58) Field of Classification Search
CPC .... H02J 7/0016; H02J 7/0019; H01M 10/425; H01M 10/441; H01M 2010/4271; H01M 2220/20
(Continued)

(56) References Cited

U.S. PATENT DOCUMENTS 5,594,320 A * 1/1997 Pacholok ............. H02J 7/0018
320/103
5,659,237 A * 8/1997 Divan .................... B60L 58/15
320/119
(Continued)

FOREIGN PATENT DOCUMENTS

CN          104410136 A      3/2015

OTHER PUBLICATIONS

Williamson, "Energy Management Strategies for Electric and Plug-in Hybrid Electric Vehicles", (2013), p. 16, 77, 84, 86, 91, 92, 97.
(Continued)

*Primary Examiner* — M'Baye Diao
(74) *Attorney, Agent, or Firm* — MacMillan, Sobanski & Todd, LLC

(57) ABSTRACT

An equalizer circuit provides both passive and active charge transfer between cells in a battery pack to improve charge and discharge efficiency. The equalizer circuit is a bilevel circuit that uses both resistive equalizers and switching equalizers to balance cell charge. The cells may be grouped into size limited sections which are balanced by resistive equalizers. The sections are balanced by switching equalizers to promote increased pack discharge capacity.

15 Claims, 3 Drawing Sheets

(52) U.S. Cl.
CPC ....... *H02J 7/0016* (2013.01); *H01M 10/4207* (2013.01); *H01M 2010/4271* (2013.01); *H01M 2220/20* (2013.01); *Y02T 10/70* (2013.01)

(58) Field of Classification Search
USPC .......................................................... 320/119
See application file for complete search history.

(56) References Cited

U.S. PATENT DOCUMENTS

| | | | | |
|---|---|---|---|---|
| 5,952,815 | A * | 9/1999 | Rouillard | H02J 7/0021 320/116 |
| 5,990,668 | A | 11/1999 | Coleman | |
| 6,008,623 | A * | 12/1999 | Chen | H02J 7/0016 320/118 |
| 6,150,795 | A * | 11/2000 | Kutkut | H02J 7/0018 320/118 |
| 6,211,650 | B1 * | 4/2001 | Mumaw | H02J 7/0016 320/120 |
| 8,120,321 | B2 * | 2/2012 | Vezzini | H02J 7/0014 320/118 |
| 8,253,378 | B2 * | 8/2012 | Lee | H02J 7/0018 320/118 |
| 8,310,204 | B2 * | 11/2012 | Lee | H02J 7/0016 320/118 |
| 8,957,636 | B2 * | 2/2015 | Ochiai | H02J 7/0016 320/118 |
| 9,148,028 | B2 * | 9/2015 | Suzuki | H02J 7/0014 |
| 9,184,602 | B2 * | 11/2015 | Kim | H02J 7/00 |
| 9,214,820 | B2 * | 12/2015 | Tsai | H03K 5/04 |
| 9,322,885 | B2 * | 4/2016 | Kain | H02J 7/0016 |
| 9,444,275 | B2 * | 9/2016 | Huang | H02J 7/0068 |
| 9,774,206 | B2 * | 9/2017 | Kim | H02J 7/0016 |
| 9,912,164 | B2 * | 3/2018 | Kumar | H02J 5/00 |
| 2006/0087287 | A1 * | 4/2006 | Thrap | H02J 7/0016 320/118 |
| 2010/0019724 | A1 * | 1/2010 | Mizutani | H01M 10/425 320/118 |
| 2012/0274283 | A1 * | 11/2012 | van Lammeren | H01M 10/441 320/118 |
| 2013/0057213 | A1 * | 3/2013 | Kuraishi | H02J 7/02 320/109 |
| 2013/0057219 | A1 * | 3/2013 | Sakata | B60L 53/24 320/118 |
| 2013/0106354 | A1 * | 5/2013 | Suzuki | H02J 7/0016 320/116 |
| 2013/0200849 | A1 * | 8/2013 | Crebier | H02M 3/1582 320/116 |
| 2014/0285151 | A1 | 9/2014 | Steck et al. | |
| 2015/0050532 | A1 | 2/2015 | Waigel et al. | |

OTHER PUBLICATIONS

Shang et al., "A Crossed Pack-to-Cell Equalizer Based on Quasi-Resonant LC Converter with Adaptive Fuzzy Logic Equalization Control for Series-connected Lithium-Ion Battery Strings", IEEE Applied Power Electronics Conference and Exposition (APEC), (2015), pp. 1685-1692.

PCT International Search Report and Written Opinion, Application No. PCT/US2017/015378, dated Apr. 18, 2017.

* cited by examiner

BILEVEL EQUALIZER FOR BATTERY CELL CHARGE MANAGEMENT

CROSS-REFERENCE TO RELATED APPLICATIONS

This application claims the benefit of U.S. Provisional Application No. 62/287,575, filed Jan. 27, 2016, the disclosure of which is incorporated herein by reference in its entirety.

BACKGROUND OF THE INVENTION

This invention relates in general to battery charge management systems. In particular, this invention relates to charge equalizer subsystems, as part of a battery management system, to balance charge levels among a plurality of battery cells in a battery pack. In one embodiment, the charge equalizer subsystem is a bilevel equalizer suitable for use in large power battery packs, such as lithium ion batteries (LIB).

Large LIBs have been in use for electric vehicles and various military applications for several years. These batteries have several advantages such as very high energy and power density, long lifetime, and high efficiency, and they can remain at a low state of charge for long periods of time without damage. These features make them attractive for many applications, and large scale production has recently led to large cost reductions. Because of these developments, large LIBs are now being evaluated by electric utilities and government agencies for purposes such as frequency regulation and decreasing grid power variations from wind and solar energy sources. Electric vehicles also take advantage of LIBs.

Large LIB packs consist of large numbers of cells connected in series or sometimes in series-parallel. For safety and maximum performance, the LIBs rely on a battery management system (BMS) that provides several functions such as charge monitoring. One basic function of the BMS is to measure the voltage of each cell and to provide an equalizer (EQU) that maintains all the cell voltages close to the same level. LIBs, and other types of high power density, high energy density batteries such as lithium sulfur, sodium ion and others currently under development, are sensitive to the charge levels of individual cells. As these cells age, individual variations in their structure become more prevalent and influential in the cell's ability to accept and output charge. For instance, the cell's charge capacity (amp hours, AH) decreases and its series resistance increases. Additionally, not all cells in a battery age at the same rate, so eventually wide variations in cell strength and performance develop over time. The resulting output and performance of the battery pack, made up of these many individual cells, is limited by the weakest cell or cells. Therefore, these cells also determine the usable capacity and lifetime of the pack.

For lithium ion battery architectures, at full charge the maximum allowable cell voltage is typically about 4.2 V, and the minimum allowable is about 2.8 V at full discharge. Charging is halted when the highest voltage cell reaches 4.2V, and discharge is halted when the lowest cell reaches 2.8 V. Thus, in order to improve efficiency and safety of these batteries, EQUs prevent overcharging of weak cells and balancing output among all of the cells. Weaker cells will charge and discharge faster than the other cells because their lower capacity and higher resistance will cause them to reach their voltage limits sooner. Therefore, EQUs are used to remove charge from these weaker cells during charge to allow more time for the other cells to charge. Some EQUs also add charge to the weaker cells during discharge to allow more time for the other cells to discharge.

There are two broad types of EQUs: Resistive or Passive equalizers (REQ) and Switching, Transfer, or Active equalizers (SEQ). REQs remove charge from the weakest cells during charging by connecting resistors in parallel with the higher voltage cells to divert current. REQs dissipate energy to bleed down the weak cells to permit the stronger cells to absorb more charge. This method of charge equalization, however, is inefficient and of no use during discharge since REQs cannot add charge to a cell.

Instead of dissipating energy, SEQs use high frequency switching circuits to transfer charge from weaker to strong cells during charge cycles, and vice versa during discharge cycles. There are a wide variety of types, with certain designs having an efficiency in the range of about 98-99%. However, in spite of their advantages, SEQs are not widely used since they are more complex and expensive than REQs.

In general, present EQUs such as REQs have high losses and do nothing to increase discharge capacity, while others such as the SEQs are too expensive for most applications. Thus, it would be desirable to improve both the efficiency and cost of the BMSs and the EQUs.

SUMMARY OF THE INVENTION

This invention relates in general to battery charge management systems. In particular, this invention relates to charge equalizer subsystems, as part of a battery management system, to balance charge levels among a plurality of battery cells in a battery pack.

In one embodiment, the charge equalizer subsystem is a bilevel equalizer suitable for use in large power battery packs, such as lithium ion batteries (LIB). In tone aspect of the invention, the bilevel equalizer comprises a plurality of cells configured to be connected together to form a battery pack, the plurality of cells divided into at least two sections. The bilevel equalizer further includes at least two resistive equalizers and a switching equalizer. Each resistive equalizer is connected to one of the at least two sections. The switching equalizer is connected between the at least two sections. In certain aspects of the invention, each cell section includes a plurality of cells connected together in one of a series or a parallel configuration. In other aspects, the at least two resistive equalizers are a plurality of resistive equalizers connected to the plurality of cell sections in a one-to-one configuration.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
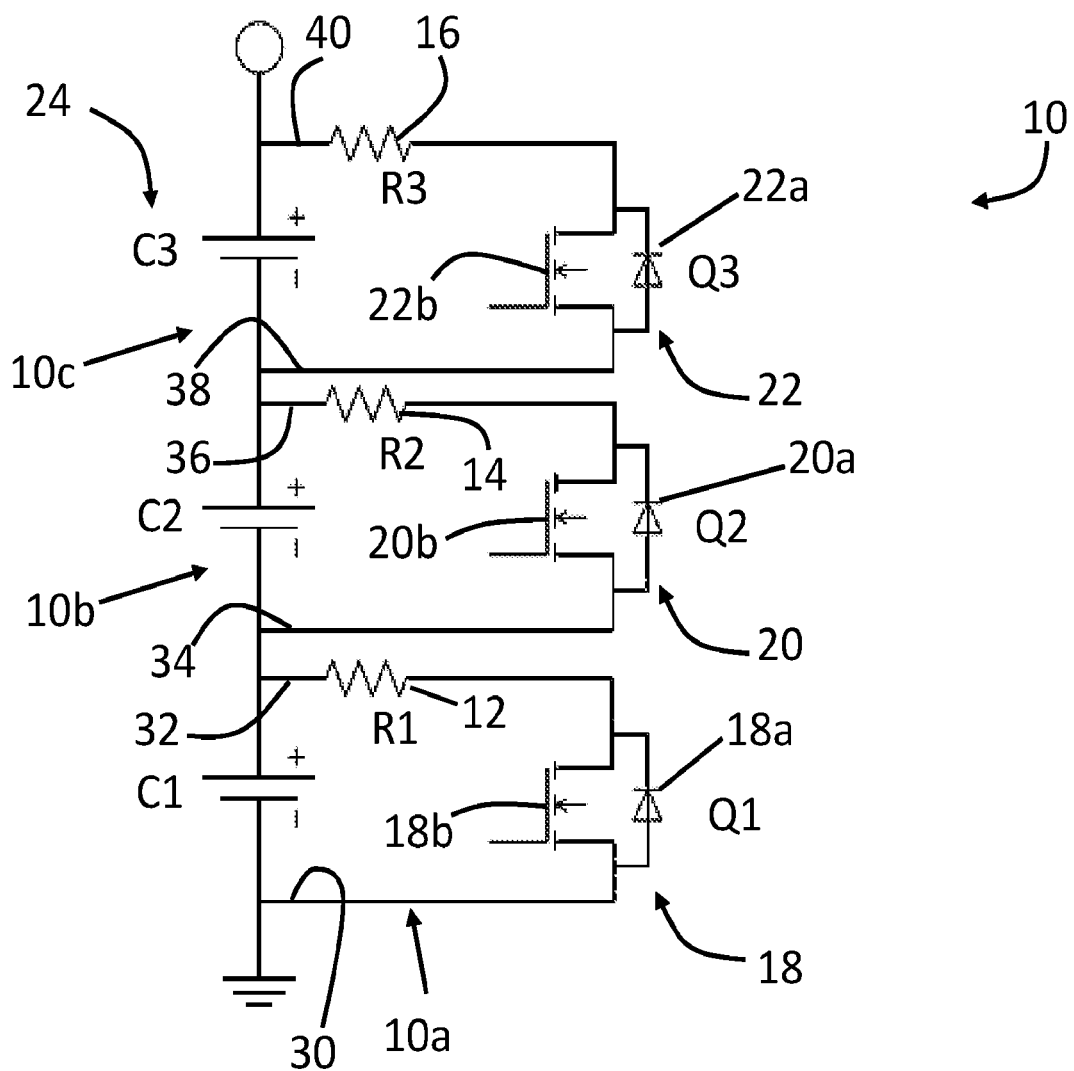
FIG. 1 is a schematic diagram of a Resistive Equalizer circuit in accordance with the invention.

Referring now to the drawings, there is illustrated in FIG. 1 a schematic diagram of a Resistive Equalizer (REQ), shown generally at 10 and in the context of a 3-cell pack As will be described below, the REQ 10 forms a portion of a Battery Management System (BMS) for controlling cell charge levels in a battery pack, such as for example an LIB. The REQ 10 comprises 3 individual resistive equalizer circuits 10a, 10b, and 10c connected to three battery cells C1, C2, C3 forming a battery pack 24. It should be understood that the REQ and other equalizer circuits (i.e., REQ, SEQ, BEQ) described herein may be used in conjunction with cells C1, C2, C3, etc. of any size, number, and chemical architecture. The REQ 10 includes resistors 12, 14, and 16 and further identified as R1, R2, and R3, respectively. REQ 10 further includes switching circuits 18, 20, and 22 further identified as Q1, Q2, and Q3. The switching circuits 18, 20, and 22 may include transistor and diode elements, though the diode elements are not a required component. The diode components are identified as 18a, 20a, and 22a and the field effect transistors (FETs) are identified as 18b, 20b, and 22b. Each individual REQ sub-circuit includes an electrical connection completing the sub-circuit around each cell C1, C2, and C3. For example, the cell level sub-circuit for cell C1 includes electrical connection 30, shown between a negative side of cell C1 and the switching element 18. electrical connection 32, which includes resistor R1 12 is connected between the switching element 18 and the positive side of cell C1. Similarly, electrical connections 34 and 36 complete a circuit between cell C2 and switching element 20, and electrical connections 38 and 40 complete a circuit between cell C3 and switching element 22.

To illustrate the operation of the REQ 10, assume cell C3 has the lowest voltage of all the cells during the charge cycle. During charge, field effect transistors (FETs) 18b, Q1 and 20b, Q2 are energized to connect resistors 12, R1 and 14, R2 across cells C1 and C2 until all 3 cell voltages are equal. The FETs act as low resistance switches. Although REQs can equalize the cell voltages, the battery pack discharge capacity is still limited by the weakest cell. For example, assume the AH capacities for C1, C2, and C3 are 50 AH, 30 AH and 60 AH, respectively, and that all are fully charged. If the pack 24 of FIG. 1 is discharged at 10 A, C2 will be fully discharged in 3 hours, but C1 will still have 20 AH and C3 will have 30 AH, respectively, of charge output remaining. In spite of their discharge limitations and low efficiency, REQs are simple and cheap, and therefore they are the most widely used type of EQU. It should be understood, as mentioned above, that other charge equalizing circuits may be substituted for the REQ 10 and remain within the scope of the invention.

Figure 2:
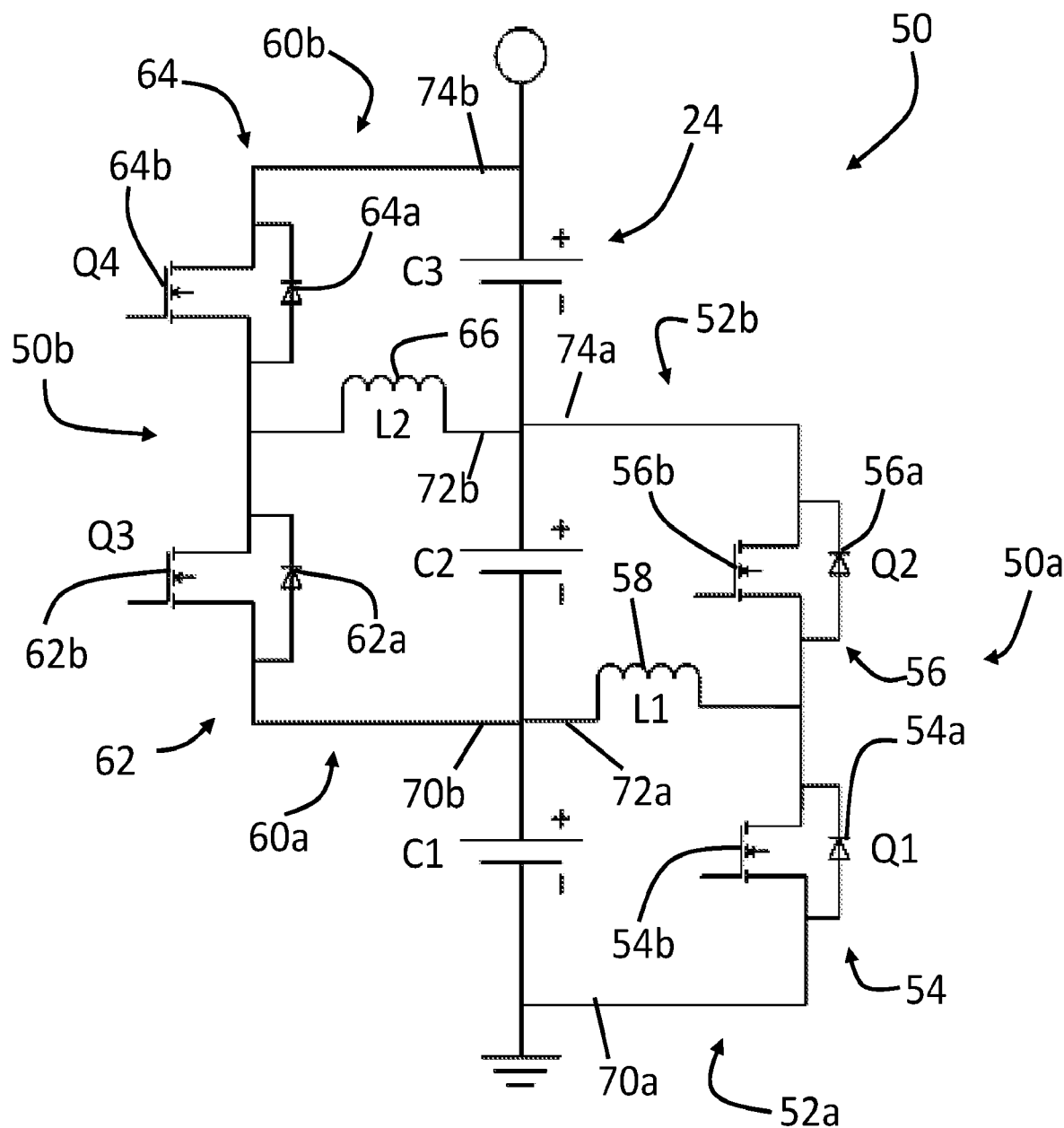
FIG. 2 is a schematic diagram of a Switched Equalizer circuit in accordance with the invention.

Referring now to FIG. 2, there is illustrated a schematic diagram of an embodiment of a Switched Equalizer (SEQ) circuit, shown generally at 50, for the 3 cell pack 24. As will be described below, the SEQ 50 forms a portion of a Battery Management System (BMS) for controlling cell charge levels in a battery pack, such as for example an LIB. Though shown as a simple SEQ circuit, it should be understood that any form or variation of SEQ may be used. This circuit has some similarity to the common DC-DC boost converter which is well known for high efficiency.

The SEQ 50 is illustrated as two SEQ subunits 50a and 50b, though any number of subunits may be combined to form the SEQ 50. The typical number of subunits may be a function of the number of battery cells to be equalized. Each subunit SEQ 50a and 50b includes a similar complement of components, but will be described in detailed operation in the context of SEQ subunit 50a. SEQ 50a is illustrated having a first circuit loop 52a having a switching and bypass unit 54 comprising a transistor/diode circuit labeled as Q1 and a second circuit loop 52b having another switching and bypass unit or transistor/diode circuit 56, labeled as Q2. Similar to the REQ circuit 10, above, the transistor/diode element 54 of the SEQ subunit 50a includes a diode 54a and a FET 54b. The transistor/diode element 56 includes a diode 56a and a FET 56b. The SEQ subunit 50a has electrical connection 70 between the negative side of cell C1 and the switching and bypass unit 54 and electrical connection 72a that includes an inductor 58, labeled as L1, between the switching and bypass unit 54 and the positive side of cell C1. The second circuit loop 52b includes an electrical connection 74a between the positive side of cell C2 and shares the electrical connection 72a. Each of the first and second circuit loops 52a and 52b include the commonly connected inductor 58.

Similar to the SEQ subunit 50a, SEQ subunit 50b includes a first circuit loop 60a and a second circuit loop 60b. The first circuit loop 60a includes a transistor/diode element 62 having a diode 62a and a FET 62b. The second circuit loop 60b is similarly configured and includes a transistor/diode element 64 with a diode 64a and a FET 64b. Each of the first and second circuit loops 60a and 60b include a commonly connected inductor 66, labeled as L2. The SEQ subunit 50b includes electrical connections 70b, 72b and 74b that are similar to those connections of SEQ subunit 50a. In one embodiment, the transistor/diodes elements of the SEQ 50 may be sized at about 100 volts and about 60 Amps. The inductor L1 may be in a size range of about 300 microhenries (µH). In one embodiment, the size of the inductors may be reduced by utilizing FETs that switch at a relatively high frequency, such as 4-100 kHz. It should be understood that the rating size of the SEQ and REQ components, in accordance with the invention, may be sized in conjunction with the desired battery pack or cell grouping outputs.

To illustrate operation of the SEQ subunits, as shown in FIG. 2, assume cells C1 and C2 are charged to different voltage levels, such that C1 has a higher voltage level than C2. When the charge level is being balanced between C1 and C2, for example, on a $1^{st}$ half cycle of operation, FET Q1 54 is turned on and current flows from cell C1 to the inductor, L1. On a $2^{nd}$ half cycle FET Q1 54 turns off, and the current in L1 flows through the body diode of the adjacent FET 56 (diode in parallel with the FET) and into the adjacent cell, C2. From the example, when Q1 is the only active FET, charge will be transferred from target cell C1 to target cell C2. When Q2 is the only active FET, charge is transferred from C2 to C1. It should be understood that the two target cells do not have to be adjacent to each other. When the target cells (those to be balanced) are positioned away from each other, charge is transferred via the cells between the two target cells. For example, from FIG. 2 if Q2 and Q4 are the only active FETs charge is transferred from C3 via C2 to C1. This switching action continues until the voltages of the two target cells are equal.

Since SEQs assist during both charge and discharge cycles and have high efficiency, they can provide much higher pack capacity. This is because the pack discharge capacity is now about the same as the average capacity of all of the cells, instead of the capacity being the weakest cell as with the REQ. This can be seen from the following numerical example for FIG. 2. As in the previous example, assume that C1 to C3 are fully charged at 50 AH, 30 AH, and 60 AH, respectively, and the pack is discharged at 10 A. If "x" is the equalization current sent to C2 from C1, and "y" is the current sent from C3, then, (10−x−y)t=30, for C2, where t=discharge time
(10+x)t=50, for C1

(10+y)t=60, for C3

Solving these equations yields:

t=4.67 hours, x=0.714 A, y=2.857 A, and discharge capacity=46.7 AH which is also the average capacity of the pack.

Recall that the capacity for the same example with a REQ was only 30 AH.

As can be seen from the above, the conventional use of REQs or SEQs as stand-alone equalizers are not satisfactory for applications that are cost sensitive and require maximum capacity over a long lifetime. It has been found that combinations of REQs and SEQs, as sub-circuits of a Bilevel Equalizer (BEQ), shown generally at 100 in FIG. 3, can provide performance comparable to that of a SEQ, and at a cost that is in the range of a REQ. The BEQ 100 presents an efficient system that can provide a very significant increase in battery capacity and at a reasonable cost. This system also can be used with other types of batteries such as lithium sulfur, sodium ion and others currently under development.

Figure 3:
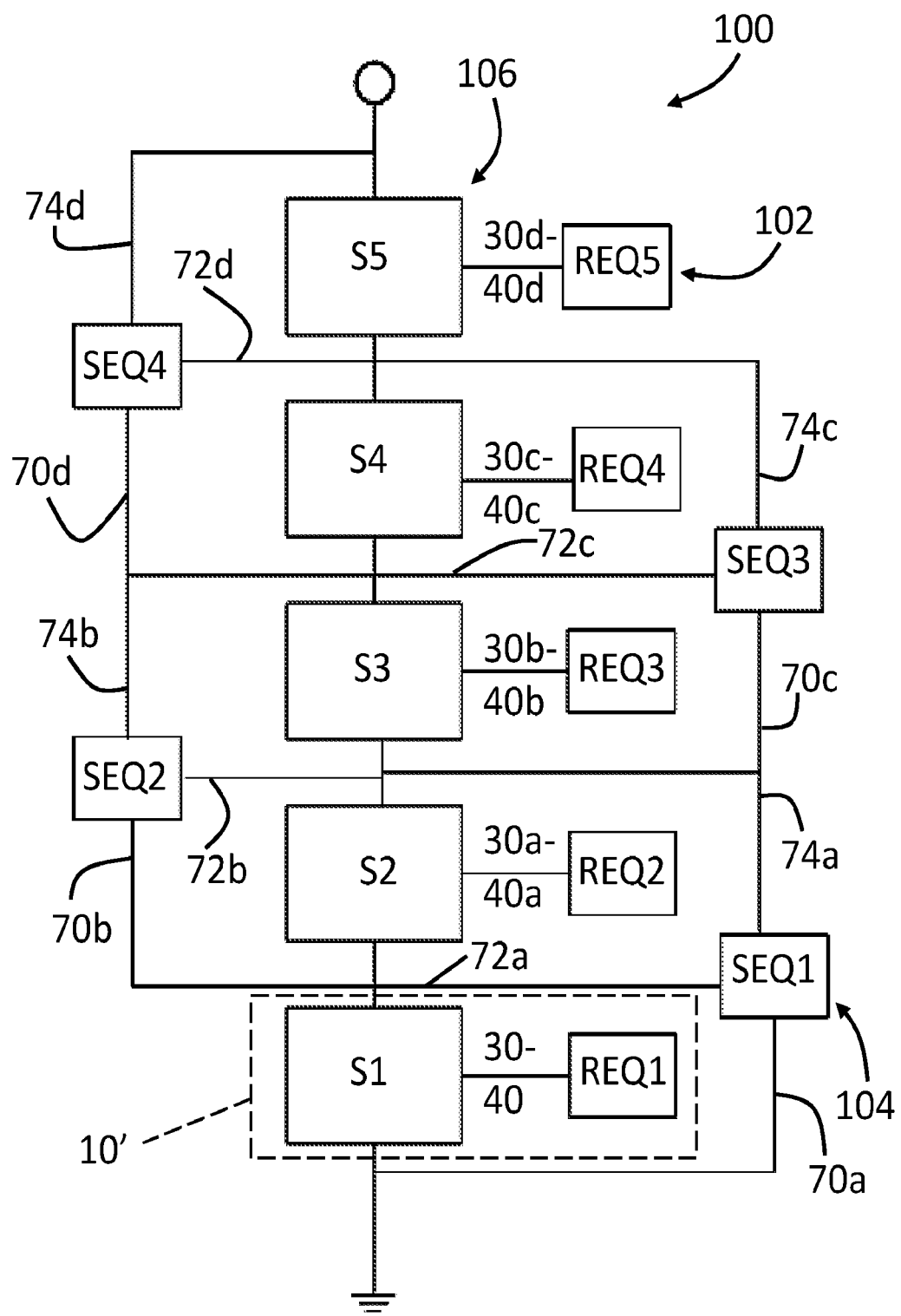
FIG. 3 is a schematic diagram of a Bilevel Equalizer circuit in accordance with the invention.

The embodiment of the BEQ 100 shown in FIG. 3, consists of a set of REQs 102, similar to REQ 10 which are augmented with SEQs 104, similar to SEQ 50. The battery pack, connected to the BEQ 100, includes cells similar to the cells C1-C3, described above. In one embodiment, the BEQ 100 is configured to work with large battery packs that consist of many cells such as, for example, 100 cells or more. It should be understood that any number of cells C1, etc. may be connected to form the battery pack in conjunction with BEQ 100. In the system shown in FIG. 3, the pack is not altered, but it is organized into 5 sections or "super cells", shown generally at 106 and labeled as S1, S2, S3, S4, and S5. In one embodiment, each cell section S1-S5 may consist of 4-8 cells, such as C1-C4 or C1-C8. The cell sections 106, however, may include more or fewer cells C1-Cn than the range of 4-8 cells, if desired. The BEQ 100 consists of two basic equalization parts: a primary equalizing circuit defined by each of the set of REQs 102 which equalize the cell voltages within each section (instead of the entire pack) and a secondary equalizing circuit defined by the SEQs 104 which equalize the section voltages of sections 106.

The BEQ 100 provides equalization at two different voltage levels. Each of the REQs only equalize cells in a single cell section 106. Thus, the problem of one or two weak cells dragging down the voltages of all cells in the battery pack is avoided. For example, if 4 cell sections are used, a weak cell will only drag down the other 3 cells in the same section. As shown in FIG. 3, the REQs, for example REQ1 is connected to the section S1 in a manner similar to the connections of REQ 10 of FIG. 1. As shown by way of example in FIG. 3, S1 includes 3 cells in an arrangement similar to the REQ 10 of FIG. 1. As such, the connection between S1 and REQ1 of FIG. 3 is designated as 10' and includes the electrical connections 30-40 of FIG. 1. Similarly, the connections of the other sections S2-S5 and REQs 2-5 are constructed in a similar manner.

The SEQ simultaneously equalizes the section voltages in a non-dissipative manner. Integrated circuits such as the Linear Technology LTC6804 are examples of suitable substitute active circuits for the REQs, and these reduce cost while providing the REQ control, cell voltage measurement, and communication with the BMS.

As described above, the numerical example of SEQ operation for 3 cells shows that the magnitude of the equalizing current can be an impacting consideration. To be effective, this current should be large enough to equalize the cells at an adequate rate during both charge and discharge. If the current is too low, the charge or discharge limit may be reached before the cells have equalized, reducing the usable battery capacity. Higher current levels reduce cost efficiencies, since larger and more expensive components are typically needed. Another advantage of the BEQ 100 over a pure SEQ is that fewer SEQ units in the BEQ 100 can lower the overall cost or offset the costs of higher power units.

It is contemplated that, in many embodiments, large packs may contain several cell sections, such as the 5 section example in FIG. 3. This means there can be several SEQ charge transfers taking place simultaneously between various sections. A computer algorithm has been developed and tested to determine these transfers. This algorithm is based on the measured maximum and minimum cell voltages in each of the sections.

In operation of one embodiment, the BEQ 100 may utilize the REQs associated with each of the cell sections during charging events only, since REQs are of no benefit during discharge, though such is not required. It should be noted that the charging current is often much higher than the discharge current, so the extra assistance provided by these REQ units during charging can be of significant benefit and provide additional cost efficiencies. One example of this is electric vehicle "fast charging" where the battery pack is charged in 30 to 60 minutes but discharged over several hours.

The charge/discharge strategies of one embodiment of the BEQ 100, described above, provide several advantages. Since the SEQs may be used during discharge, the discharge capacity will be close to the average of the section capacities. This is a significant improvement over a pure REQ, where the discharge capacity is only equal to that of the weakest cell in the entire pack.

Regardless of which circuit is used to perform the primary equalizing circuit function of the REQs 102, which is to equalize the cell voltages within the section, the SEQs 104 equalize the section voltages. The REQ 102 circuit operates by using resistors to drain charge from the cells until all cell voltages in the section equal the lowest cell voltage. An active substitute operates by transferring charge from the higher voltage cells to the lower voltage cells, thus improving efficiency but adding cost.

Although the passive REQs 10 of the BEQ embodiment shown in FIG. 3 provide a cost effective solution, the REQs 10 of the BEQ 100 may be replaced by or augmented with active circuit equalizers, such as the SEQs 50 or bi-directional DC to DC converters. For example, substitution of the REQs 10 for devices such as an EM1401EVM made by Texas Instruments can actively equalize up to 14 cell voltages within a section. Another example is the LTC3300-1 made by Linear Technology which can actively equalize up to 12 cell voltages within a section. Both of these examples use bi-directional DC to DC converters to transfer charge between each of the individual cells and the stack of all the series connected cells in the section. Regardless of whether the cells within a section are equalized by a passive or an active circuit, the functionality of the BEQ 100 in FIG. 3 will be same since the same type of SEQs 104 can be used to equalize the section voltages.

An experiment based in part on the BEQ 100 of FIG. 3 was conducted with (12) 50 AH GAIA cobalt oxide LIB cells that were chosen at random from a group that was about 8 years old. These cells had been used in various lab experiments, and although the number of charge/discharge cycles was limited, their previous operating history had not been recorded. The BEQ for this experiment used 3 sections with 4 cells each. One charge/discharge test was run with a pure REQ and another with the BEQ. The discharge capacity of the BEQ test was about 14% higher than that for the REQ test. Generally, as batteries exhibit larger cell variations; by design, cycling, or age; the improvement in performance of the BEQ over the REQ will also be much higher.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A bilevel equalizer for battery voltage management comprising:
    a plurality of cells configured to be connected together to form a battery pack, the plurality of cells divided into at least two sections, each of the two sections including a weaker cell and a stronger cell, and the two sections defining a first section and a second section;
    at least two passive equalizers for equalizing cell voltages within each section, each passive equalizer connected to each of the plurality of cells in a one-to-one relationship within the at least two sections, the passive equalizers associated with each section operative during charging to dissipate charge from the weaker cell to permit the stronger cell to absorb more charge; and
    an active equalizer for equalizing section voltages between the at least two sections, the active equalizer operative during charging to transfer charge from the first section to the second section; and the active equalizer operative during discharging to transfer charge from the second section to the first section.

2. The bilevel equalizer of claim 1 wherein the plurality of cells in each cell section are connected together in one of a series or a parallel configuration.

3. The bilevel equalizer of claim 1 wherein each of the at least two passive equalizers comprise a resistor and a switching circuit connected to each cell.

4. The bilevel equalizer of claim 3 wherein the switching circuit includes a field effect transistor.

5. The bilevel equalizer of claim 4 wherein the active equalizer includes two active equalizer subunits, each active equalizer subunit includes a switching circuit having a transistor and a diode.

6. The bilevel equalizer of claim 4 wherein each of the at least two passive equalizers are electrically connected across positive and negative sides of each of the corresponding plurality of cells to form a plurality of resistive equalizing sub-circuits each resistive equalizing sub-circuit permitting current flow through the resistor as the switching circuit is cycled between an on state that electrically completes the circuit and an off state that electrically breaks the circuit, each of the plurality of cells being connected in series.

7. The bilevel equalizer of claim 6 wherein the active equalizer is a plurality of active equalizers, each of the plurality of active equalizers defining two switching equalizer subunits, each switching equalizer subunit includes a switching circuit having a transistor and a diode.

8. The bilevel equalizer of claim 7 wherein each pair of the plurality of switching equalizer subunits are in electrical communication with an inductor.

9. The bilevel equalizer of claim 8 wherein the inductor is connected between the at least two sections and each of the two switching equalizer subunits are connected across one of the at least two sections.

10. The bilevel equalizer of claim 1 wherein
    the plurality of cells are connected together in series within each section, each of the at least two passive equalizers comprise a resistor and a switching circuit connected to each cell; and
    the active equalizer includes an inductor that is electrically connected between two of the at least two sections and two switching and bypass units, each switching and bypass units including a field effect transistor and a diode.

11. The bilevel equalizer of claim 10 wherein each of the at least two passive equalizers are electrically connected across positive and negative sides of each of the corresponding plurality of cells to form a plurality of resistive equalizing sub-circuits each resistive equalizing sub-circuit permitting current flow through the resistor as the switching circuit is cycled between an on state that electrically completes the circuit and an off state that electrically breaks the circuit, each of the plurality of cells being connected in series.

12. The bilevel equalizer of claim 11 wherein the at least two sections are connected in series and each the switching and bypass units in conjunction with the inductor form a circuit around a respective section, and each of the switching and bypass units of the switching equalizer is configured to be cycled between an on state that electrically completes the circuit and an off state that electrically breaks the circuit.

13. The bilevel equalizer of claim 12 wherein one of the at least two switching and bypass circuits is cycled between the on and off states while the other switching and bypass circuit is in the off state.

14. The bilevel equalizer of claim 10 wherein the field effect transistor and the diode are configured to accept about 100 volts and about 60 Amps and the inductor is about 300 micro-henries.

15. The bilevel equalizer of claim 10 wherein the field effect transistors of the switching and bypass circuit are cycled between the on and off states at a frequency range of about 4-100 kHz.

* * * * *